(12) United States Patent
Ansari et al.

(10) Patent No.: US 7,808,913 B2
(45) Date of Patent: Oct. 5, 2010

(54) DYNAMIC BANDWIDTH ALLOCATION AND SERVICE DIFFERENTIATION FOR BROADBAND PASSIVE OPTICAL NETWORKS

(75) Inventors: Nirwan Ansari, Montville, NJ (US); Yuanqiu Luo, Hightstown, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 742 days.

(21) Appl. No.: 11/405,364

(22) Filed: Apr. 17, 2006

(65) Prior Publication Data
US 2006/0268704 A1    Nov. 30, 2006

Related U.S. Application Data

(60) Provisional application No. 60/671,973, filed on Apr. 15, 2005.

(51) Int. Cl.
*H04L 12/43* (2006.01)
(52) U.S. Cl. .................................. 370/241; 370/458
(58) Field of Classification Search ................ 370/230, 370/241, 229, 235, 468, 252, 458
See application file for complete search history.

(56) References Cited

U.S. PATENT DOCUMENTS

| | | | | |
|---|---|---|---|---|
| 5,357,360 A * | 10/1994 | Imhoff et al. | ............... | 398/100 |
| 5,610,841 A * | 3/1997 | Tanaka et al. | ............... | 725/115 |
| 5,706,281 A * | 1/1998 | Hashimoto et al. | .......... | 370/252 |
| 6,023,467 A * | 2/2000 | Abdelhamid et al. | ..... | 370/236.2 |
| 6,064,652 A * | 5/2000 | Buckland et al. | ............ | 370/235 |
| 6,259,699 B1 * | 7/2001 | Opalka et al. | ............... | 370/398 |
| 6,308,078 B1 * | 10/2001 | Van De Water | ............. | 455/503 |
| 6,317,234 B1 * | 11/2001 | Quayle | ........................... | 398/9 |
| 6,775,293 B1 * | 8/2004 | Robotham et al. | .......... | 370/412 |
| 6,778,557 B1 * | 8/2004 | Yuki et al. | ................... | 370/468 |
| 6,862,621 B2 * | 3/2005 | Takada et al. | ............... | 709/224 |
| 6,931,013 B2 * | 8/2005 | Saikusa | .................... | 370/395.4 |

(Continued)

OTHER PUBLICATIONS

"Adaptive Filter Theory," by Simon S. Haykin, 1986, Table of Contents and pp. 216-222.

(Continued)

*Primary Examiner*—Kevin C Harper
(74) *Attorney, Agent, or Firm*—Connolly Bove Lodge & Hutz LLP

(57) ABSTRACT

A dynamic upstream bandwidth allocation scheme is disclosed, i.e., limited sharing with traffic prediction (LSTP), to improve the bandwidth efficiency of upstream transmission over PONs. LSTP adopts the PON MAC control messages, and dynamically allocates bandwidth according to the on-line traffic load. The ONU bandwidth requirement includes the already buffered data and a prediction of the incoming data, thus reducing the frame delay and alleviating the data loss. ONUs are served by the OLT in a fixed order in LSTP to facilitate the traffic prediction. Each optical network unit (ONU) classifies its local traffic into three classes with descending priorities: expedited forwarding (EF), assured forwarding (AF), and best effort (BE). Data with higher priority replace data with lower priority when the buffer is full. In order to alleviate uncontrolled delay and unfair drop of the lower priority data, the priority-based scheduling is employed to deliver the buffered data in a particular transmission timeslot. The bandwidth allocation incorporates the service level agreements (SLAs) and the on-line traffic dynamics. The basic limited sharing with traffic prediction (LSTP) scheme is extended to serve the classified network traffic.

20 Claims, 6 Drawing Sheets

U.S. PATENT DOCUMENTS

| | | | |
|---|---|---|---|
| 6,987,731 B2 * | 1/2006 | Shimada et al. | 370/235 |
| 7,428,239 B1 * | 9/2008 | Seigneurbieux | 370/418 |
| 7,450,515 B2 * | 11/2008 | Song et al. | 370/236.2 |
| 2002/0101820 A1 * | 8/2002 | Gupta et al. | 370/229 |
| 2002/0172216 A1 * | 11/2002 | Asashiba et al. | 370/442 |
| 2003/0039211 A1 * | 2/2003 | Hvostov et al. | 370/230 |
| 2003/0100267 A1 * | 5/2003 | Itoh et al. | 455/69 |
| 2003/0103525 A1 * | 6/2003 | Wahl | 370/465 |
| 2003/0133460 A1 * | 7/2003 | Lee et al. | 370/395.43 |
| 2004/0131067 A1 * | 7/2004 | Cheng et al. | 370/412 |
| 2005/0226249 A1 * | 10/2005 | Moore | 370/395.21 |
| 2005/0238016 A1 * | 10/2005 | Nishibayashi et al. | 370/389 |
| 2006/0105719 A1 * | 5/2006 | Itoh et al. | 455/69 |
| 2006/0121856 A1 * | 6/2006 | Itoh et al. | 455/69 |
| 2006/0205358 A1 * | 9/2006 | Itoh et al. | 455/69 |

OTHER PUBLICATIONS

"Probability and Random Processes for Electrical Engineering," 2d Edition, by Alberto Leon-Garcia, 1994, Table of Contents and p. 115.

"A Bandwidth Guaranteed Polling MAC Protocol for Ethernet Passive Optical Networks," by Maode Ma, et al., 10 pages.

"Ethernet Passive Optical Network (EPON): Building a Next-Generation Optical Access Network," by Glen Kramer, et. al., Feb. 2002, pp. 66-73.

IPACT: A Dynamic Protocol for an Ethernet PON (EPON), by Glen Kramer, et al., Feb. 2002, pp. 74-80.

"An Architecture for Differentiated Services," by S. Blake, et al., 1998, pp. 1-36.

"Dynamic Bandwidth Allocation Algorithm for Multimedia Services over Ethernet PONs," by Su-il Choi, et al., Dec. 2002, pp. 465-468.

"Self-Similarity Through High-Variability: Statistical Analysis of Ethernet LAN Traffic at the Source Level," by Walter Willinger, et al., 1997, pp. 71-86.

"Part 3: Media Access Control (MAC) Bridges," ANSI/IEEE Std 801.2D, 1998 Edition.

(Miyoshi) "QoS Dynamic Bandwidth Allocation Scheme in Gigabit-Ethernet Passive Optical Networks" In: IEEEXplore (On Line, <URL: http://ieeexplore.ieee.org/xpl/freeabs_all.jsp?arnumber=1312458>) Jun. 20, 2004 entire document.

(Assi) "Dynamic Bandwidth Allocation for Quality-of-Service Oer Ethernet PONs" in: IEEEX;lore (On Line, <URL: http://ieeexplore.ieee.org/xpls/abs_all.jsp?arnumber=1242972>) Nov. 1, 2003 entire document.

(Banerjee) "Achieving Open Access in Ethernet PON (EPON)" in: IEEXplore (On Line, <URL: http://ieeexplore.ieee.org/Xplore/login.jsp?url=/iel5/9987/32090/01501324.pdf>) Mar. 6, 2005 entire document.

* cited by examiner

DYNAMIC BANDWIDTH ALLOCATION AND SERVICE DIFFERENTIATION FOR BROADBAND PASSIVE OPTICAL NETWORKS

CROSS REFERENCE TO RELATED APPLICATIONS

This application claims the benefit of priority to U.S. Provisional Application No. 60/671,973, filed Apr. 15, 2005, entitled LIMITED SHARING WITH TRAFFIC PREDICTION FOR DYNAMIC BANDWIDTH ALLOCATION OVER BROADBAND PASSIVE OPTICAL NETWORKS AND SERVICE DIFFERENTIATION ENHANCEMENT THEREFOR.

BACKGROUND OF THE INVENTION

This invention relates to the problem of dynamic bandwidth allocation over passive optical networks. It arbitrates the upstream channel bandwidth among multiple optical network units (ONUs). In addition, this invention relates to the problem of service differentiation over passive optical networks (PONs). It integrates queuing, scheduling, and class-based bandwidth allocation to serve diverse end users. Specifically, the basic limited sharing with traffic prediction (LSTP) scheme is extended to serve the classified network traffic over broadband PONs (EPONs, BPONs, GPONs).

Passive optical networks (PONs) address the first mile of the communication infrastructure between the service provider central offices and the customer sites, also known as the "access network." With the expansion of services offered over the Internet, a dramatic increase of bandwidth has been facilitated in the backbone network through the use of wavelength division multiplexing (WDM), providing tens of Gigabits per second per wavelength. At the same time, the local area networks (LANs) have been scaled up from 10 Mbps to 100 Mbps and are being upgraded to Gigabit Ethernets. Such a growing gap between the capacity of the backbone network and the end users' needs results in the serious bottleneck of the access network in between [3]. It is desired to have access network technology that can provide low cost and efficient equipment to facilitate multi-service access to the end users. PONs are considered as an attractive and promising solution to the broadband subscriber access network. As an inexpensive, simple, and scalable technology, and with the capability of delivering integrated services, PONs are deliberated in the standardization process of the IEEE 802.3ah Ethernet in the First Mile (EFM) Task Force [1] and ITU-T Study Group 15 [2], which aim to significantly increase the broadband service performance while minimizing equipment, operation, and maintenance costs.

As a low-cost, high-speed technology, and with the recent approval of PON standards IEEE 802.3ah, ITU-T G.983x, and ITU-T G.984x, PONs are an attractive and promising solution to the broadband subscriber access network. As illustrated in FIG. 1, a PON consists of an optical line terminal (OLT) located at the provider central office and a set of associated optical network units (ONUs) that deliver broadband services to the end users. A single fiber extends from an OLT to a 1:N passive optical splitter, which fans out multiple single fiber drops to different ONUs. The active electronic components in the traditional access networks, such as regenerators and amplifiers, are eliminated in PONs and replaced with the less expensive passive optical splitters, which are simpler and easier to maintain. A major feature of PONs is the utility of a shared upstream channel among multiple ONUs, and thus bandwidth management is a critical issue in order to improve the PON efficiency. The existing bandwidth allocation schemes pose some critical limitations. One of the major problems is that the upstream data arriving during the waiting time cannot be delivered in the next timeslot, thus posing additional data delay, severe data loss, and longer queue size. These are the barriers to achieving high bandwidth efficiency over broadband access networks. As a result, known available bandwidth allocation schemes are inefficient over these networks.

Since the access network is required to accommodate various kinds of traffic, service differentiation is a distinguished feature that PONs are expected to provide. Owing to the differences in subscriber's service level agreements (SLAs), different end users may have different bandwidth requirements. A pragmatic approach is to employ timeslot-based bandwidth allocation by providing various lengths of timeslots to serve different traffic. The existing service differentiation schemes pose some critical limitations. The major problems include how to enqueue and schedule the local traffic, and how to allocate the upstream bandwidth to different queues. Available service differentiation schemes only tackle part of the problem, and they are inefficient for delivering diverse traffic over PONs.

Data are broadcasted from the OLT downstream to the ONUs using the entire bandwidth of the downstream channel. ONUs selectively receive data destined for them by matching the carried destination addresses.

The process of transporting data upstream to the OLT over PONs is different from that of transporting data downstream to the local users. In the upstream direction, a different channel wavelength is employed for the upstream traffic, and multiple ONUs share this common upstream channel. Therefore, only a single ONU may transmit during a timeslot in order to avoid data collisions. Data from local users are first buffered at an ONU until the exclusively assigned timeslot arrives. The buffered data would be "bursted" out to the OLT in the timeslot at the full channel speed.

In order to provide diverse quality of service (QoS), the bandwidth management of the upstream channel is a critical issue for the successful implementation of PONs. Different PON technologies have their own MAC control messages to facilitate the upstream bandwidth allocation. For example, EPONs adopt MultiPoint Control Protocol (MPCP) [1] developed by the IEEE 802.3ah EFM Task Force. The REPORT message is used by the ONU to report the bandwidth requirement to the OLT, while the GATE message is used by the OLT to assign the timeslot for a specific ONU. There have been numerous proposals in the literature to tackle the upstream bandwidth allocation.

The limited bandwidth allocation (LBA) [3] scheme grants an ONU the requested timeslot length, but no more than an upper bound. The bandwidth guaranteed polling (BGP) scheme [4] allocates the timeslot to an ONU according to its service level agreement (SLA). Choi and Huh [5] proposed the classified bandwidth allocation for multimedia services. However, the BGP scheme is incompatible with the PON standard and would not be standardized. The LBA scheme and the Choi and Huh scheme do not consider the incoming data during the ONU waiting time, which ranges from sending the queue length report to sending the buffered data, and thus, such data have to be deferred to the next timeslot, posing additional delay and loss.

Assi et al. [6] predicted such incoming data of the high priority traffic in a rough way by simply replacing it with the actual number of incoming data during the last waiting time. The drawback is that the service order of ONUs changes drastically, with the heavily loaded ONUs always being served after the lightly loaded ones, and therefore, the prediction of the incoming high priority traffic is severely impaired because the waiting time of each ONU may change drastically.

SUMMARY OF THE INVENTION

The method of the present invention provides a technique for allocating the upstream channel bandwidth efficiently and dynamically among multiple ONUs with a very low time and space complexity. The present method also provides a technique for differentiating the service to diverse network traffic through a combination of queuing, scheduling, and class-based bandwidth allocation.

We disclose a dynamic upstream bandwidth allocation scheme, i.e., limited sharing with traffic prediction (LSTP), to improve the bandwidth efficiency of upstream transmission over PONs. LSTP adopts the standard MAC control messages, and dynamically allocates bandwidth according to the on-line traffic load. The ONU report includes the already buffered data and a prediction of the incoming data, thus reducing the data delay and alleviating the data loss. ONUs are served by the OLT in a fixed order in LSTP to facilitate the traffic prediction.

In order to improve the bandwidth efficiency over PONs, the upstream bandwidth is dynamically allocated according to the on-line network traffic load. At the end of each timeslot, an ONU reports its local queue status, including the already buffered data and a prediction of the data arriving during the waiting time. The prediction process is based on the bursty nature of network traffic, and has a very low computational complexity that makes the disclosed scheme scalable for any size of PONs. The traffic prediction contributes to the reduction of data latency and data loss.

With respect to service differentiation, each optical network unit (ONU) classifies its local traffic into three classes with descending priorities: expedited forwarding (EF), assured forwarding (AF), and best effort (BE). Data with higher priority replace data with lower priority when the buffer is full. In order to alleviate uncontrolled delay and unfair drop of the lower priority data, the priority-based scheduling is employed to deliver the buffered data in a particular transmission timeslot. The bandwidth allocation incorporates the service level agreements (SLAs) and the on-line traffic dynamics. The basic limited sharing with traffic prediction (LSTP) scheme is extended to serve the classified network traffic.

BRIEF DESCRIPTION OF THE DRAWINGS

The foregoing brief description, as well as further objects features and advantages will be understood more completely from the following detailed description of presently preferred, but nonetheless illustrative, embodiments in accordance with the present invention, with reference being had to the accompanying drawings, wherein.

DETAILED DESCRIPTION OF THE PREFERRRED EMBODIMENTS

The major challenges of PONs include the MAC protocol design and the multi-service provisioning. Because of the directional property of the passive optical splitter, it is difficult for an ONU to detect data collisions by the conventional CSMA/CD MAC protocol which was designed for Ethernet. Therefore, an efficient MAC protocol is crucial to ensure high bandwidth utilization. Since PONs do not support QoS (quality of service) directly while the access network is required to accommodate various kinds of traffic, multi-service access is a distinguished feature that PONs are expected to provide. Owing to the differences in subscriber's service level agreements (SLAs), different ONUs may have different bandwidth requirements. A pragmatic approach is to employ the timeslot-based bandwidth allocation by providing various lengths of timeslots to different ONUs.

Fixed bandwidth allocation (FBA) grants each ONU a fixed timeslot length in every service cycle. A service cycle is defined as the time that each ONU transmits its data once to the OLT. FBA works exactly like the time division multiple access (TDMA), in which the timeslot of each ONU is fixed beforehand and is not related to the actual traffic arrival rate. Without the overhead of the queue status report and the transmission grant, FBA is simple to implement. On the other hand, an ONU will occupy the upstream channel for its assigned timeslot even if there are no data to transmit, thus resulting in the increased delay for all the data buffered in other ONUs. A lot of data could be backlogged in the buffers while the upstream channel is lightly loaded or even idle, hence leading to underutilization of the upstream channel.

Limited bandwidth allocation (LBA) monitors the incoming traffic by using the MAC control messages to report the local queue size and to notify the bandwidth arbitration decision (e.g., the REPORT/GATE mechanism in EPONs). The timeslot length of an ONU is upper-bounded by the maximum timeslot length $B_{max}$, which could be specified by SLA or other system parameters. When the reported queue size is less than the limit, the OLT grants the bandwidth request; otherwise, $B_{max}$ is granted. LBA tracks the traffic load by means of the queue status reports, the granted timeslot length varies according to the dynamic traffic, and the service cycle varies because ONUs are assigned with different timeslot lengths in different service cycles. The conservative feature of LBA confines each ONU by its own limit, thus restricting the aggressive competition for the upstream bandwidth.

Figure 3:
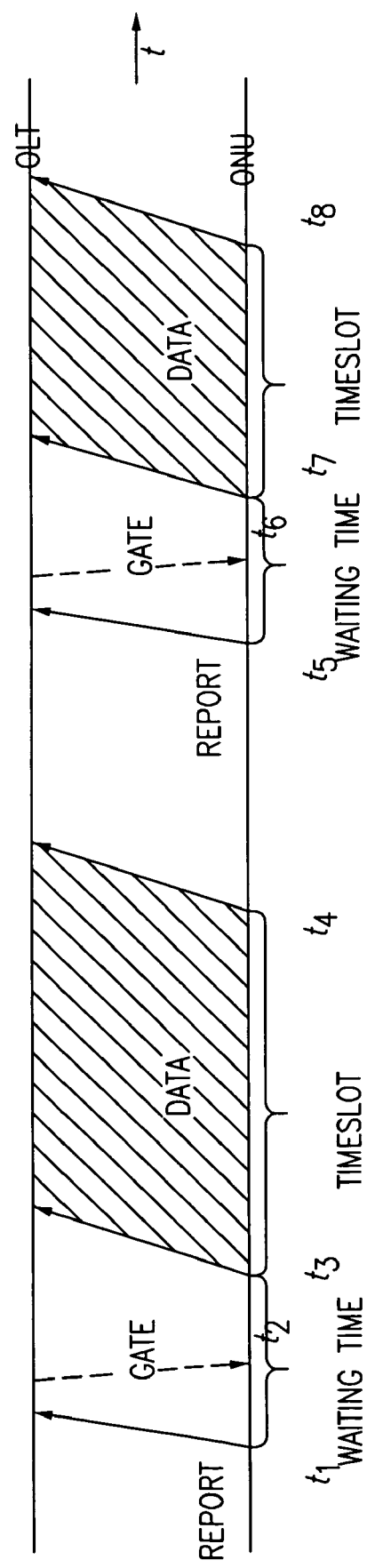
FIG. 3 is a timing chart useful in explaining the operation of an EPON scenario.

Under the aforementioned bandwidth negotiation mechanism, each ONU experiences a waiting time from sending the queue status to sending the buffered data, as illustrated in FIG. 3. When sending a REPORT message at time $t_1$, an ONU only reports the already buffered data to the OLT, and therefore, data arrived during the waiting time (i.e., $t_3$-$t_1$) have to be deferred to the next timeslot even if the upstream channel is lightly loaded. Credit-based bandwidth allocation (CBA) [3] takes such data into consideration, and when the OLT allocates the upstream bandwidth, it adds a credit into each ONU's requirement. $B_{grant}=B_{queue}+C$, where $B_{grant}$ is the granted bandwidth to an ONU, $B_{queue}$ is the data (in terms of bandwidth) queued up in the buffer, and C is the credit. C could be a constant credit or a linear credit. The incoming data during the waiting time are expected to be transmitted (or partially transmitted) within the current timeslot.

In LBA, there might be some lightly loaded ONUs with the bandwidth requirement less than the limits. The sum of the under-exploited bandwidth of the lightly loaded ONUs is called the excessive bandwidth, i.e., $B_{excess}$. As an extension of LBA, excessive bandwidth reallocation (EBR) exploits $B_{excess}$, by redistributing it among the heavily loaded ONUs. The heavily loaded $ONU_k$ obtains an additional bandwidth, $B_{add,k}$, where $B_{add,k}=(B_{excess}*B_{max,k})/(\Sigma_j B_{max,i})$, and $B_{max,i}$ is the bandwidth limit of $ONU_i$ specified in LBA.

Other than the upstream channel bandwidth allocation among different ONUs, it is necessary for a single ONU to provide multiple services to its different end users. Residing in customer premises, an ONU must be capable of supporting data, voice, and video services to the end users. This can be approached by means of a combination of queuing, scheduling, and class-based bandwidth allocation.

Figure 2:
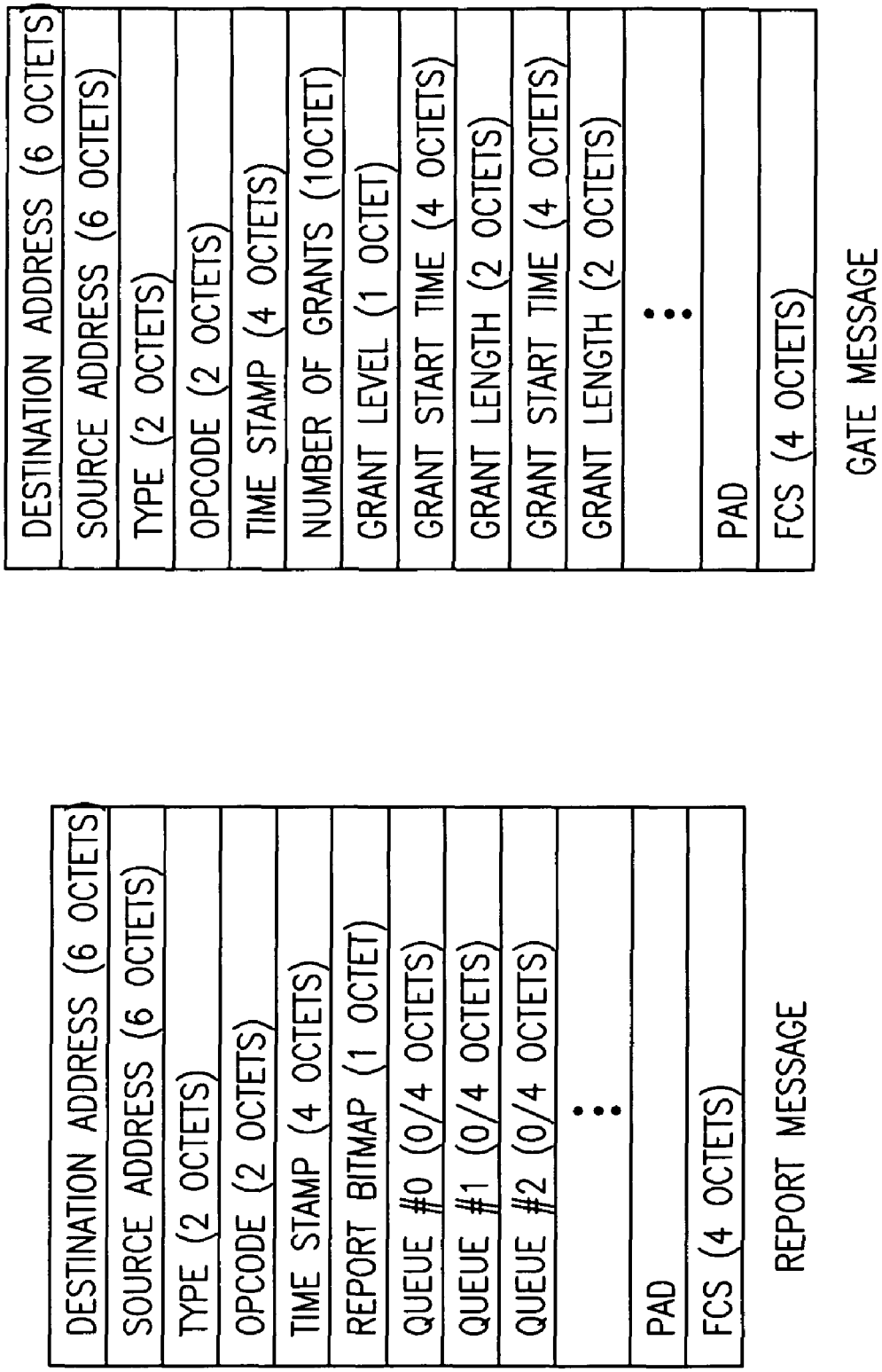
FIG. 2 is a representation of a REPORT message and a GATE message as used in accordance with a preferred embodiment of the present invention.

Different PON technologies provide their own support for service differentiation. For example, in EPONs, as shown in FIG. 2, one 64-byte GATE message carries up to 6 grants to a particular ONU. The "number of grants" field specifies how many grants are in the message, and the "grant level" field indicates the order of the queues to which grants are generated. Each grant contains a grant start time and a grant length. One 64-byte REPORT message from an ONU reports up to 8 queues' status. The "report bitmap" field identifies the order of the reported queues. The OLT processes the queue status report, and sends back the GATE message including at least one grant, depending on the bandwidth allocation algorithm. Therefore, reporting multiple queues of an ONU and granting multiple requirements to an ONU are possible, thus making service differentiation provisioning to the end users of an ONU feasible.

Categorizing the traffic of an ONU into different classes is a practical approach for service differentiation [11]. The high priority class is "expedited forwarding" (EF), which is delay sensitive and requires bandwidth guarantees. The medium priority class is "assured forwarding" (AF), which is not delay sensitive, but requires bandwidth guarantees. The low priority class is "best effort" (BE), which is neither delay sensitive nor bandwidth guaranteed. Data belonging to different classes are enqueued into their corresponding priority queues. All queues share the same buffer. When the buffer is full, the incoming data with a higher priority replace the lower priority data while the incoming low priority data are dropped immediately. The buffered data are transmitted according to a specific scheduling scheme. As defined in IEEE 802.1D [12], the strict priority scheduling serves the buffered higher priority data first. The BE data can only be transmitted when the other two queues are empty. Adhering to the priority order, the strict priority scheduling serves the higher priority data, which arrive during the waiting time, ahead of the lower priority data, which may already be queued up in the buffer. As shown in FIG. 3, the EF data arriving during the waiting time (i.e., $t_7-t_5$) will be served ahead of the AF and BE data arriving earlier (i.e., before $t_5$). Therefore, the lower priority data suffer the uncontrolled increasing delay (if the buffer is not full) or unfair drop (if the buffer is full).

The priority-based scheduling [5] tackles the unfairness by employing strict priority scheduling within a specific time interval. After an ONU transmits all buffered data in an interval, the data arriving after this interval will be served if the current timeslot can still transmit more data. By configuring the interval as the time between sending the queue status (i.e., from $t_1$ to $t_5$ in FIG. 3), the higher priority data arriving in the waiting time (i.e., $t_7-t_5$) will be served after all classes of data of the previous interval (i.e., $t_5-t_1$) have been served. This scheme provides a bounded delay for the low priority data.

Reference [5] handles the class-based bandwidth allocation by collecting the queue status from all ONUs before making decisions. The OLT assigns a fixed bandwidth to the EF traffic of all ONUs regardless of its dynamics. The AF requests are granted as follows: if the sum of the AF requests of all ONUs is less than or equal to the leftover bandwidth after having served the EF services, all AF requests are granted; otherwise, the leftover bandwidth is equally distributed among all AF requests. The leftover bandwidth after having served the EF and AF traffic is distributed among all BE requests. The major drawbacks include the fixed bandwidth allocation for the EF traffic, which penalizes the AF and BE traffic by increasing the data delay; and the long report collection time, which does not end until having received reports from all ONUs.

The algorithm proposed in reference [6] estimates the incoming EF traffic in the waiting time by the amount of such data in the previous cycle, and is referred to as DBA2. The reported EF traffic is the sum of the buffered EF data plus the estimation, while the reported AF and BE traffic is the actually buffered amount. The bandwidth requests are granted by EBR, with the lightly loaded queues receiving instantaneous grants while the grants for heavily loaded queues being deferred until all reports have been received. DBA2 alleviates the delay of collecting all reports by granting the lightly loaded queues immediately. This algorithm estimates the incoming EF data arriving during the waiting time, and gives priority to the EF traffic by allocating the estimated bandwidth. The drawback is that the service order of ONUs changes in every service cycle, with the heavily loaded ONUs always being served after the lightly loaded ones, and therefore, the estimation of the incoming EF data is severely impaired because the waiting time of each ONU may change drastically.

Limited Sharing with Traffic Prediction (LSTP) Scheme

The LSTP scheme relies on the PON MAC control messages to allocate the upstream bandwidth. Each ONU predicts its bandwidth requirement of the next timeslot, and sends a message to the OLT. The OLT determines the bandwidth allocation based on the report and the SLA.

Residing in customer premises, an ONU must be capable of supporting broadband data, voice, and video services to the local users. Categorizing the traffic of an ONU into different classes is a practical approach for provisioning differentiated services. We borrow the traffic classes from Diffserv [7], in which the high priority class is the expedited forwarding (EF), the medium priority class is the assured forwarding (AF), and the low priority class is the best effort (BE). Data belonging to different classes are enqueued into their corresponding priority queues. All queues share the same buffer. When the buffer is full, the incoming data with a higher priority replace the lower priority data while the incoming low priority data are dropped immediately.

Figure 4:
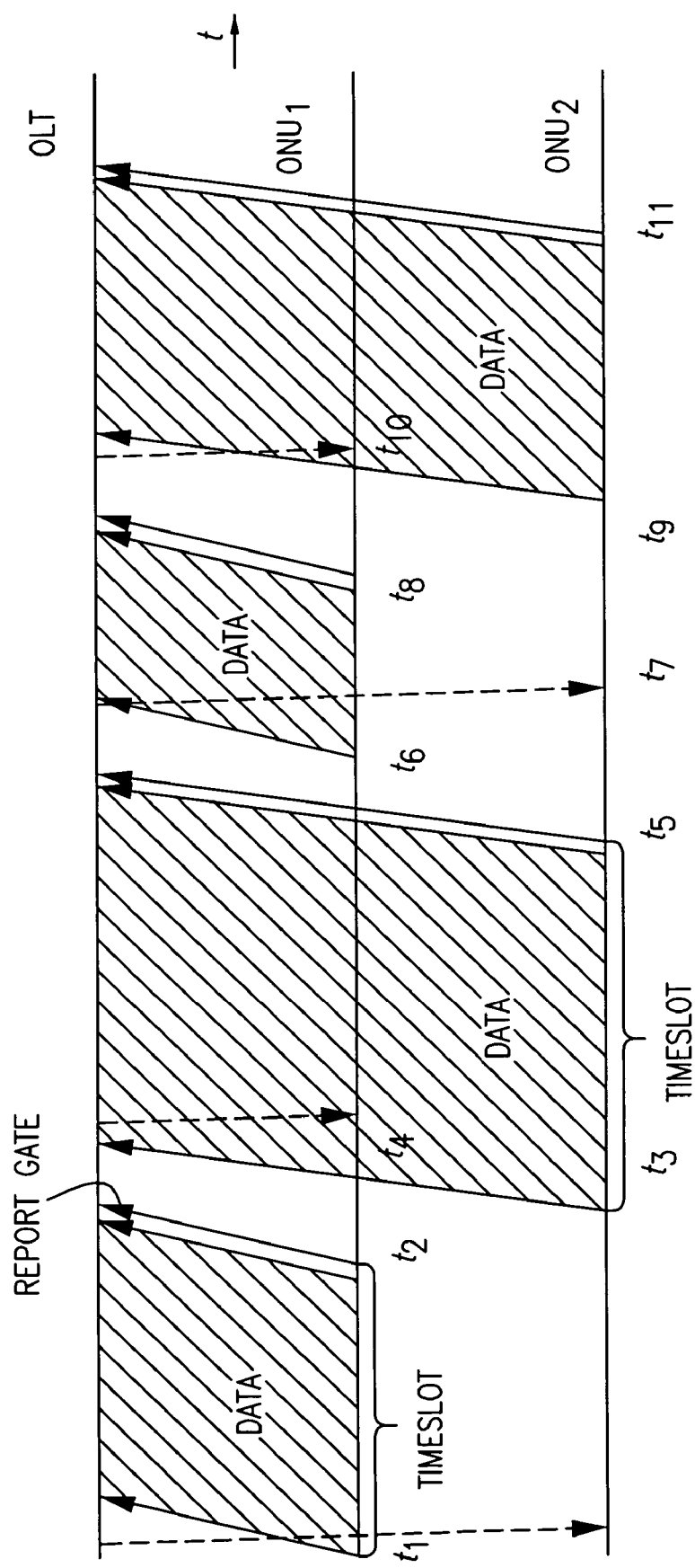
FIG. 4 is a timing chart useful in explaining the operation of an EPON incorporating limited sharing with traffic prediction (LSTP) for dynamic bandwidth allocation over EPONs.

In LSTP, as shown in FIG. 4, each ONU transmits the buffered data to the OLT in its exclusively assigned timeslot. An ONU piggybacks its bandwidth requirement of the next transmission by utilizing the upstream control message (e.g., the REPORT message of EPONs). The OLT grants the requirement by sending back a downstream message (e.g., the GATE message of EPONs), and serves the ONUs in a fixed order (e.g., the OLT serves the two ONUs alternately as shown in FIG. 4, which illustrates the EPON scenario).

The service interval of an ONU is defined as the time between its data transmission. For example, as shown in FIG.

4, a service interval, say n, with respect to $ONU_1$, ranges from time $t_1$ to time $t_6$. Time $t_2$ to time $t_4$ is the RTT between $ONU_1$ and the OLT plus the report processing time. Time $t_2$ to time $t_6$ is the waiting time for $ONU_1$ in service interval n, during which $ONU_1$ is idle, and more data from the local users are enqueued. Service interval (n+1) of $ONU_1$ begins at time $t_6$, and the granted timeslot from time $t_6$ to time $t_8$ is decided on the REPORT message sent at time $t_2$. With respect to $ONU_2$, service interval n begins at time $t_3$ and ends at time $t_9$. Time $t_3$ to time $t_5$ is the exclusive timeslot for $ONU_2$, and a report of its EF, AF, and BE queue status is sent at time $t_5$. Time $t_5$ to time $t_9$ is the waiting time of $ONU_2$ in service interval n.

In LSTP, an ONU predicts the data arrived during the waiting time in terms of bandwidth as $$\hat{B}_{i,c}^w(n+1) = \sum_{k=0}^{L-1} \alpha_{i,c,k}(n) B_{i,c}^w(n-k) \quad (1)$$

where $\hat{B}_{i,c}^w(n+1)$ is the predicted data of class c (c∈{EF, AF, BE}) at $ONU_i$ arrived during the waiting time of service interval (n+1) in terms of bandwidth, $B_{i,c}^w(n)$ is the actual amount of class c data arrived at $ONU_i$ during the waiting time of service interval n in terms of bandwidth, $\alpha_{i,c,k}(n)$ is the weight factor, and L is the order of the traffic predictor. The intuition behind the prediction is the network traffic self-similarity, which implies that network traffic exhibits a long-rang dependence [8], and traffic is correlated between timeslots.

The weight factor is updated by the least mean squares (LMS) algorithm [9] as $$\alpha_{i,c,k}(n+1) = \alpha_{i,c,k}(n) + \mu(n) \cdot \frac{e_{i,c}(n)}{B_{i,c}^w(n)}, \quad (2)$$

where $\mu(n)$ is the step size, and $e_{i,c}(n)$ is the prediction error, i.e.

$$e_{i,c}(n) = B_{i,c}^w(n) - \hat{B}_{i,c}^w(n). \quad (3)$$

The computational complexity for the bandwidth prediction is O(L).

The predicted data in terms of bandwidth, i.e., $\hat{B}_{i,c}^w(n)$, if optimal, should be equal to the actual arrived data in terms of bandwidth during the waiting time, i.e., $B_{i,c}^w(n)$. Owing to the imperfection of the predictor, the predicted data may turn out to be smaller or larger than the actual ones. The prediction error in Eq. (3) is employed to adaptively adjust the step size, thus improving the prediction accuracy.

In service interval n, $ONU_i$ requires its bandwidth for service interval (n+1) by sending a message to the OLT, indicating the bandwidth requirement for the next transmission. The bandwidth requirement is the sum of the enqueued data $B_{i,c}^q(n)$ and the prediction $\hat{B}_{i,c}^w(n+1)$, i.e., $$B_{i,c}^r(n+1) = B_{i,c}^q(n) + \hat{B}_{i,c}^w(n+1). \quad (4)$$

The OLT instantaneously makes the bandwidth allocation decision after having received a requirement. The granted bandwidth of class c traffic at $ONU_i$ for service interval (n+1) is $$B_{i,c}^g(n+1) = \min\{B_{i,c}^r(n+1), S_{i,c}\}, \quad (5)$$

where $S_{i,c}$ is the maximum bandwidth parameter of $ONU_i$ specified in the SLA for traffic class c.

The bandwidth allocation of class c traffic at $ONU_i$ is upper-bounded by the smaller value of the bandwidth request $B_{i,c}^r(n+1)_i$, and the maximum bandwidth parameter $S_{i,c}$. The assigned bandwidth, if the bandwidth requirement is no more than the maximum bandwidth parameter, dynamically changes upon the incoming traffic.

In the optimal case, when the actual incoming data are equal to the prediction result, all the enqueued data are transmitted from the ONU to the OLT, and no data are deferred to the next timeslot. When the actual data are less than the prediction, the assigned timeslot is long enough for the enqueued data, and the prediction is also deemed a success. If the actual data exceed the prediction, the assigned timeslot can only transmit part of the enqueued data, and the leftover ones have to wait for the next timeslot. The prediction fails in the last case. The prediction success probability and its impact on the network performance will be theoretically analyzed in the next section.

Performance Analysis

In this section we analyze the performance of LSTP in terms of the success probability of bandwidth prediction, data loss, and data delay. For notational simplicity, we omit the referencing of the service interval in the following analysis.

The prediction error plays a key factor on the network performance. We call the bandwidth prediction is successful if $e_{i,c} = B_{i,c}^w - \hat{B}_{i,c}^w \leq 0$. Therefore, the success probability of bandwidth prediction is $$P_{i,c}^s = P\{e_{i,c} \leq 0\}. \quad (6)$$

For the LMS-based adaptive prediction, the prediction error is Gaussian [9]. Assume the prediction error has mean $m_{i,c}$ and variance $\sigma_{i,c}^2$, i.e., $e_{i,c} \sim N(m_{i,c}, \sigma_{i,c}^2)$, the success probability of bandwidth prediction is $$\begin{aligned} P_{i,c}^s &= P\{e_{i,c} \leq 0\} \\ &= \frac{1}{\sqrt{2\pi}\,\sigma_{i,c}} \int_{-\infty}^{0} e^{-(x-m_{i,c})^2/2\sigma_{i,c}^2} dx \\ &= 1 - Q\left(-\frac{m_{i,c}}{\sigma_{i,c}}\right) \\ &= Q\left(\frac{m_{i,c}}{\sigma_{i,c}}\right), \end{aligned} \quad (7)$$

where Q(.) is the Q-function [10]. The probability that the prediction fails is $P_{i,c}^f = 1 - P_{i,c}^s$.

The data delay is defined as the average time from enqueuing a packet at an ONU buffer to sending out the last bit of the packet to the OLT. We focus on the delay of the incoming data during the waiting time. In LSTP, the data delay differs according to the prediction result. When the prediction succeeds, i.e., $e_{i,c} = B_{i,c}^w - \hat{B}_{i,c}^w \leq 0$, the required bandwidth is enough to transfer the incoming data during the waiting time to the OLT, and thus the data delay is related to the average service interval length. Assume the average service interval length is $t_{int}$, the data delay under successful prediction is $t_{int}/2$. When $e_{i,c} = B_{i,c}^w - \hat{B}_{i,c}^w > 0$, the prediction fails, and such incoming data have to wait for the next service interval for transmission. The corresponding delay is the same as the one in a system without traffic prediction, i.e., $$\frac{t_{int}}{2} + t_{int}.$$

Combining both of the cases, the data delay is $$D = P_{i,c}^s \cdot \frac{t_{int}}{2} + P_{i,c}^f \cdot \left(\frac{t_{int}}{2} + t_{int}\right) \quad (8)$$

$$= \frac{3t_{int}}{2} - P_{i,c}^s \cdot t_{int}.$$

Compared to a system without traffic prediction, LSTP improves the data delay of the data arrived in the waiting time by $$\beta = \frac{D_{no\ prediction} - D}{D_{no\ prediction}} \quad (9)$$

$$= \frac{P_{i,c}^s \cdot t_{int}}{\frac{3t_{int}}{2}}$$

$$= \frac{2}{3} P_{i,c}^s.$$

The delay reduction is closely related to the prediction success probability. More accurate prediction means a higher $P_{i,c}^s$, and the delay of the data arrived during the waiting time will be further reduced.

LSTP employs the prioritized queuing mechanism. All classes of data share a common physical buffer. The EF data have the highest priority, the AF data have the medium priority, and the BE data have the lowest priority. The incoming higher priority data replace the lower priority ones if the buffer is full.

The EF traffic experiences data loss if the buffer is full and there are neither AF nor BE data already enqueued at the buffer. Assume the fixed buffer size at $ONU_i$ is $A_i$, the EF fame loss probability at $ONU_i$ is $$P_{i,EF}^{loss} = P\{B_{i,EF}^w + B_{i,EF}^q > A_i\} \quad (10)$$

$$= P\{B_{i,EF}^w - \widehat{B}_{i,EF}^w > A_i - B_{i,EF}^q - \widehat{B}_{i,EF}^w\}$$

$$= P\{e_{i,EF} > A_i - B_{i,EF}^q - \widehat{B}_{i,EF}^w\}$$

$$= Q\left(\frac{A_i - B_{i,EF}^q - \widehat{B}_{i,EF}^w - m_{i,EF}}{\sigma_{i,EF}}\right),$$

where $m_{i,EF}$ and $\sigma_{i,EF}^2$ are the mean and variance of the EF traffic prediction error $e_{i,EF}$, respectively.

An incoming AF data is lost if the buffer is full and the enqueued data belong to either EF or AF traffics. The corresponding data loss probability is $$P_{i,AF}^{loss} = P\{B_{i,EF}^w + B_{i,EF}^q + B_{i,AF}^w + B_{i,AF}^q > A_i\} \quad (11)$$

$$= P\{e_{i,EF} + e_{i,AF} > A_i - B_{i,EF}^q - \widehat{B}_{i,EF}^w - B_{i,AF}^q - \widehat{B}_{i,AF}^w\}.$$

The EF and the AF traffics are independent, and LSTP employs dedicated predictors to these two traffics, respectively, and therefore, $e_{i,EF}$ and $e_{i,AF}$ are independent. Further assume that $e_{i,EF} \approx N(m_{i,EF}, \sigma_{i,EF}^2)$ and $e_{i,AF} \approx N(m_{i,AF}, \sigma_{i,AF}^2)$, then, $$P_{i,AF}^{loss} = P\{e_{i,EF} + e_{i,AF} > A_i - B_{i,EF}^q - \widehat{B}_{i,EF}^w - B_{i,AF}^q - \widehat{B}_{i,AF}^w\} \quad (12)$$

$$= Q\left(\frac{A_i - B_{i,EF}^q - \widehat{B}_{i,EF}^w - B_{i,AF}^q - \widehat{B}_{i,AF}^w - m_{i,EF} - m_{i,AF}}{\sqrt{\sigma_{i,EF}^2 + \sigma_{i,AF}^2}}\right).$$

Similarly, the BE data are lost if the buffer is full. Assume the prediction errors of the EF, AF, and BE traffic are $e_{i,EF} \approx N(m_{i,EF}, \sigma_{i,EF}^2)$, $e_{i,AF} \approx N(m_{i,AF}, \sigma_{i,AF}^2)$, and, $re_{i,BB} \approx N(m_{i,BB}, \sigma_{i,BB}^2)$ respectively; as discussed above, these prediction errors are independent. Therefore, the data loss probability of the BE traffic at $ONU_i$ is $$P_{i,BE}^{loss} = P\{B_{i,EF}^w + B_{i,EF}^q + B_{i,AF}^w + B_{i,AF}^q + B_{i,BE}^w + B_{i,BE}^q > A_i\} \quad (13)$$

$$= P\left\{e_{i,EF} + e_{i,AF} + e_{i,BE} > A_i - \sum_c \left(B_{i,c}^q + \widehat{B}_{i,c}^w\right)\right\}$$

$$= Q\left(\frac{A_i - \sum_c \left(B_{i,c}^q + \widehat{B}_{i,c}^w + m_{i,c}\right)}{\sqrt{\sum_c \sigma_{i,c}^2}}\right).$$

Simulations

Figure 1:
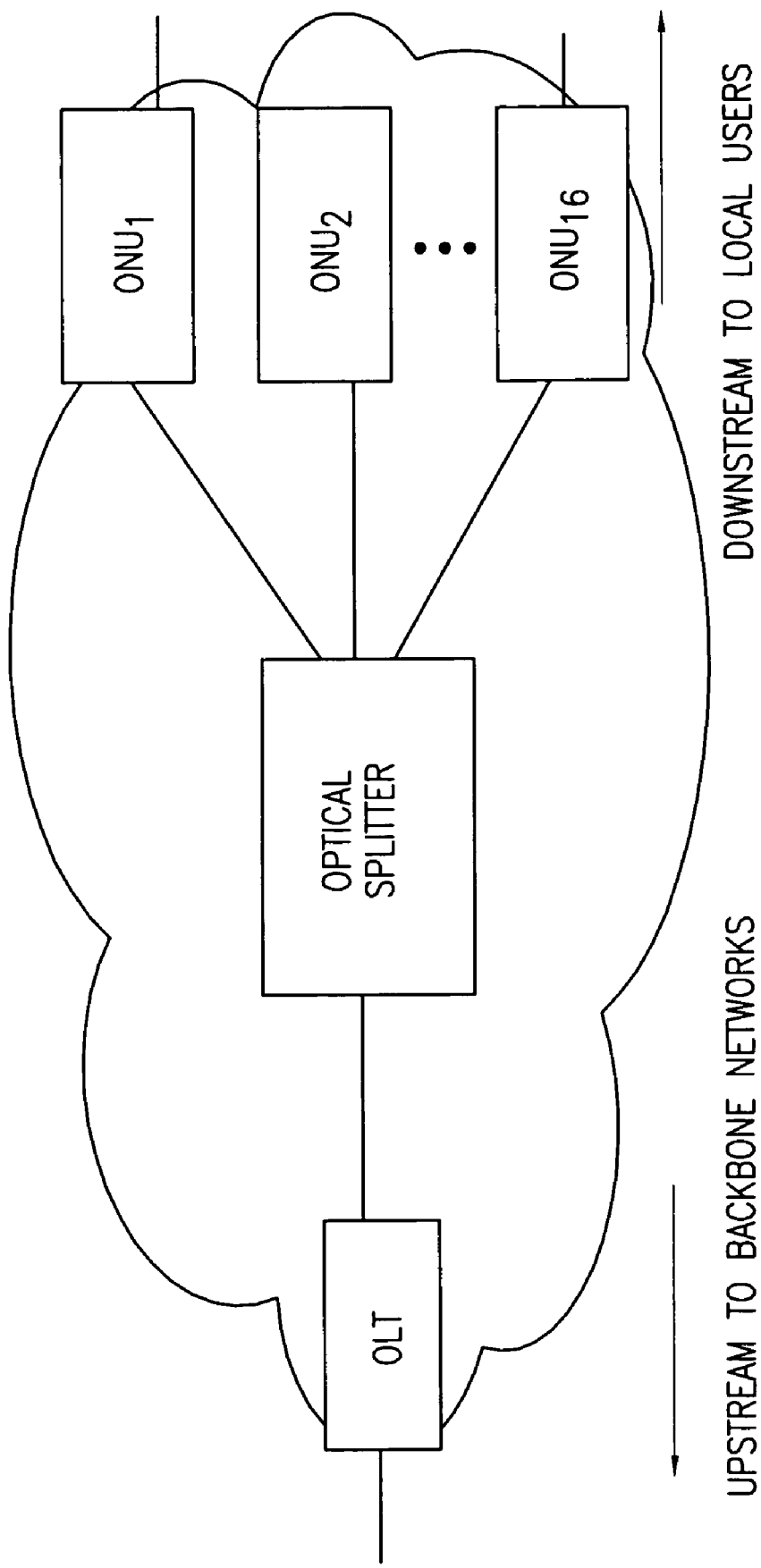
FIG. 1 is a functional block diagram of a passive optical network (PON)

The LSTP scheme performance is evaluated via simulation results. A system model shown in FIG. 1 is set up in the OPNET simulator with one OLT and 32 ONUs. Each ONU has a finite buffer of 20 Mbytes, and the downstream and upstream channels are both 1 Gbps. The incoming traffic is self-similar with the Hurst parameter of 0.8. The length of Ethernet data randomly varies from 64 bytes to 1518 bytes. The total traffic load of the entire network is changing from 0.1 to 0.8; 20%, 30%, and 50% of the traffic are the EF, AF, and BE data, respectively. For comparison purposes, we applied the LBA scheme in reference [3], the DBA2 scheme in reference [6], and our proposed LSTP scheme on this system model. The order of the predictor in LSTP, i.e., L, is set to 4, and the step size μ is set by $$\mu(n) = \frac{L}{\sum_{k=0}^{L-1} [B_{i,c}^w(n-k)]^2}.$$

Figure 5:
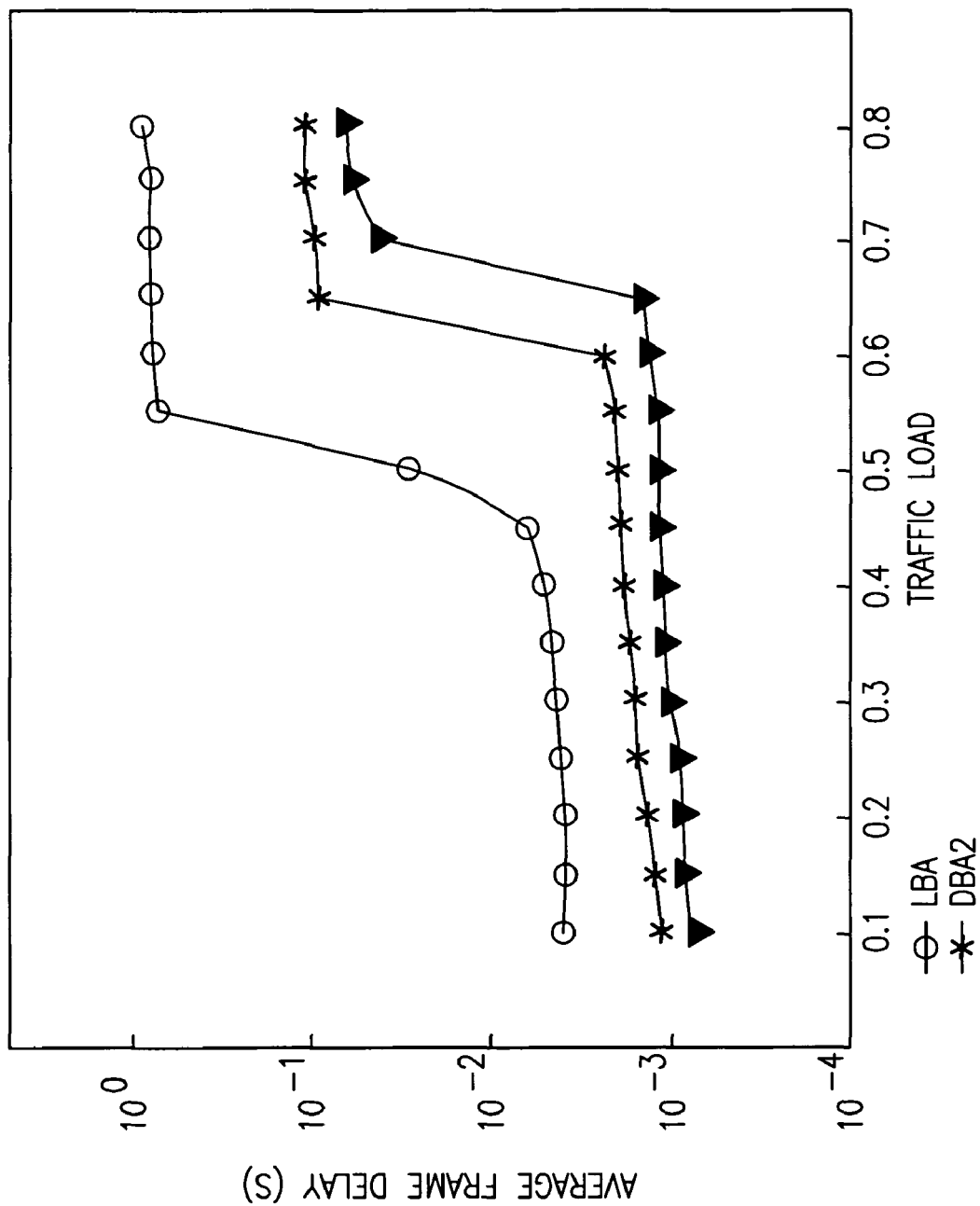
FIG. 5 is a graph of average frame delay vs. network traffic load for the type of system represented by FIG. 4.

The figures of merits are the data delay and the data loss. FIG. 5 illustrates the relationship between the average data delay and the network traffic load. LBA experiences the longest delay, which is attributed to the fact that LBA disregards the incoming data during the waiting time, and thus, more data are likely deferred to the next timeslot. DBA2 alleviates this problem by employing a rough prediction of the incoming EF traffic during the waiting time. The delay reduction from LBA to DBA2 shows that traffic prediction plays as a significant role in reducing the upstream transmission latency. LSTP outperforms both DBA2 and LBA. Several points contribute to the shortest average data delay in LSTP. First, LSTP predicts all classes of traffic instead of only one class in DBA2 and no traffic prediction in LBA. Second, the prediction accuracy has been improved in LSTP by employing the LMS-based predictor, which is suitable for adaptive on-line traffic prediction. Third, LSTP implements the fixed ONU service order instead of the dynamic service order in DBA2, and reduces the drastic change of the service interval length in DBA2, thus facilitating the traffic prediction. Forth, the OLT replies the ONU bandwidth requirement instantaneously in LSTP. In DBA2, the heavily-loaded ONUs are always served after the lightly-loaded ones, and the deferred service for those heavily-loaded ONUs results in longer delay of the incoming data.

Figure 6:
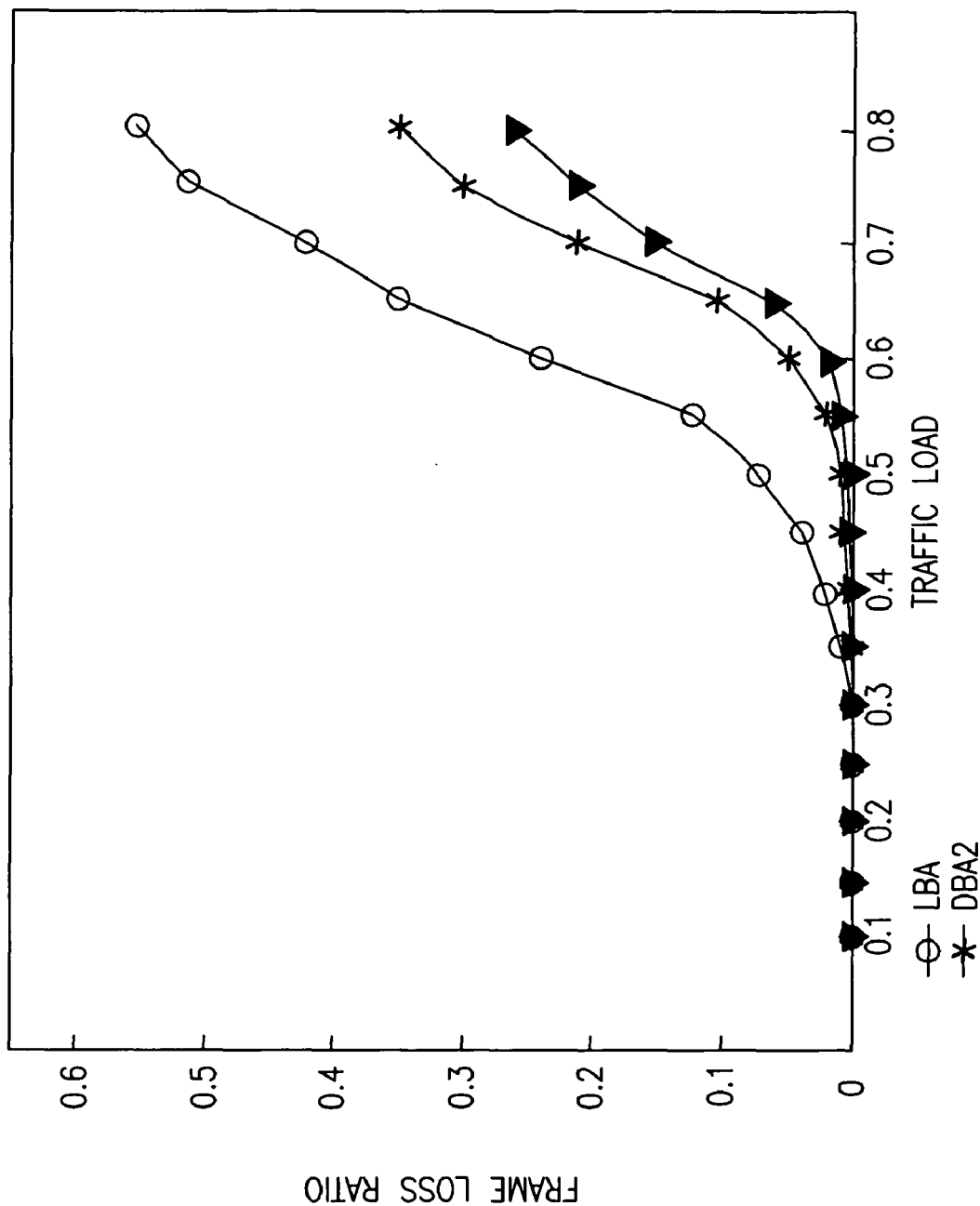
FIG. 6 is a graph of from loss ration vs. network traffic load for the type of system represented by FIG. 4.

A shorter average data delay means that the ONUs transmit the data faster, and therefore, less chance that data are dropped because of buffer overflow. The performance of LBA, DBA2, and LSTP in terms of the data loss exhibits the similar trend to that of the data delay. The data loss ratio is defined as the number of dropped data versus the total number of data. Again, as shown in FIG. 6, LBA has the most data loss, and LSTP has the least, implying that the traffic prediction and instantaneous bandwidth allocation provided by LSTP alleviate the data loss by requesting the predicted bandwidth, thus reducing the number of backlogged data at the buffer.

The disclosed LSTP scheme enhances the upstream bandwidth sharing among ONUs by means of the class-based traffic prediction and the SLA-based upper-bounded bandwidth allocation. The performance of LSTP has been theoretically analyzed in terms of the prediction success probability, the average data delay, and the class-based data loss probability. The simulation results demonstrate that LSTP enhances the accuracy of the prediction of the incoming data during the waiting time, and the improved traffic prediction thus contributes to the reduction of data latency and loss.

Although preferred embodiments of the invention have been disclosed for illustrative purposes, those skilled in the art will appreciate that many additions, modifications and substitutions are possible without departing from the scope and spirit of the invention as defined by the accompanying claims.

REFRENCES

[1] IEEE 802.3ah task force home page. http://www.ieee802.org/3/efm
[2] ITU-T Study Group 15 home page. http://www.itu.int/ITU-T/studygroups/com15/index.asp
[3] G. Kramer, B. Mukherjee, and G. Pesavento, "IPACT: a dynamic protocol for an Ethernet PON (EPON)," *IEEE Communications Magazine*, vol. 40, no. 2, pp. 74-80, February 2002.
[4] M. Ma, Y. Zhu, and T. H. Cheng, "A bandwidth guaranteed polling MAC protocol for Ethernet passive optical networks," in *Proc. IEEE INFOCOM*, San Francisco, Calif., pp. 22-31, March-April 2003.
[5] S. Choi and J. Huh, "Dynamic bandwidth allocation algorithm for multimedia services over Ethernet PONs," *ETRI Journal*, vol. 24, no. 6, pp. 465-468, December 2002.
[6] C. M. Assi, Y. Ye, D. Sudhir, and M. A. Ali, "Dynamic bandwidth allocation for quality-of-service over Ethernet PONs," *IEEE Journal on Selected Areas in Communications*, vol. 21, no. 9, pp. 1467-1477, November 2003.
[7] S. Blake, D. Black, M. Carlson, E. Davies, Z. Wang, and W. Weiss, "An architecture for differentiated services," *IETF RFC* 2475.
[8] W. Willinger, M. Taqqu, R. Sherman, and D. Wilson, "Self-similarity through high-variability: statistical analysis of Ethernet LAN traffic at the source level," *IEEE/ACM Transactions on Networking*, vol. 5, no. 1, pp. 71-86, February 1997.
[9] S. Haykin, *Adaptive filter theory*, $3^{rd}$ edition, Prentice Hall, 1996.
[10] A. Leon-Garcia, *Probability and random processes for electrical engineering*, $2^{nd}$ edition, Addison-Wesley, 1993.
[11] G. Kramer and G. Pesavento, "Ethernet passive optical network (EPON): building a next-generation optical access network," *IEEE Commun. Mag.*, vol. 40, no. 2, February 2002, pp. 66-73.
[12] IETF RFC 2475, "An architecture for differentiated services," December 1998.
[13] ANSI/IEEE Standard 802.1D, *part* 3: *Media Access Control (MAC) Bridges*, 1998.

What is claimed:

1. A method for allocating a network bandwidth timeslot to a network unit by a terminal, the terminal configured to serve a plurality of downstream network units and to receive upstream communications from a plurality of network units in respective time slots on a time division basis, the terminal further configured to apportion upstream bandwidth among the plurality of network units by granting a terminal-determined variable duration to respective timeslots of network units in response to a request from a network unit, the method comprising:

storing, at one or more of the plurality of network units, local information destined for the terminal;

requesting, by the one or more of the plurality of network units, at least a portion of network bandwidth, the request including a transmission time of stored local data awaiting transmission from the one or more of the plurality of network units to the terminal and a transmission time of data predicted to arrive at the one or more of the plurality of network units during a waiting time, wherein the waiting time is an estimate of the time required to transmit from the one or more of the plurality of network units to the terminal data expected to be received in an interval between the request and the initiation of transmission from the one or more of the plurality of network units to the terminal, wherein the data expected to be received is determined at least in part on actual received data during a previous waiting time and a weight factor, the weight factor being updateable using an algorithm including at least a step size and a prediction error;

employing the prediction error to adaptively adjust the weight factor to improve an accuracy of the determination of an amount of the data expected to be received during the waiting time; and receiving a granted bandwidth allocation upper-bounded by a smaller value of the bandwidth request and a maximum bandwidth parameter.

2. The method of claim 1, wherein the terminal is an optical line terminal located at a service provider's central office and the network units are optical network units, optically linked to the terminal.

3. The method of claim 2, wherein the terminal is a passive splitter for downstream communication.

4. The method of claim 1, wherein the request is sent by the one or more of the plurality of network units at the conclusion of sending a burst of data, the estimate of time being the time required to transmit data received in the interval between the request and the next initiation of transmission from the one or more of the plurality of network units to the terminal.

5. The method of claim 1, wherein sets of local information are stored by the one or more of the plurality of network units, each member of a set of local information having one of a plurality of predefined priority levels, the method further comprising, at the network unit:

maintaining a buffer of members to be transmitted to the terminal;

enqueing members for transmission to the terminal in queues, each queue being dedicated to members of a specific priority; and in the interval between a network unit request and a following transmission of data, replacing data in the buffer with higher priority data being received when the buffer is full.

6. The method of claim 1, wherein the maximum bandwidth parameter is the maximum bandwidth of the one or more of the plurality of network units specified for a traffic class.

7. The method of claim 1, wherein an assigned bandwidth, if the request is no more that the maximum bandwidth parameter, dynamically changes upon incoming traffic.

8. The method of claim 1, comprising receiving re-allocated bandwidth from a lightly loaded network unit at a heavily loaded network unit.

9. A method for providing service differentiation among information sets of different priority, comprising:

at a network unit, maintaining members to be transmitted to a terminal which serves a plurality of downstream network units and receives upstream communications from the network units in respective time slots on a time division basis, the terminal to apportion upstream timeslots among network units by granting a respective timeslot to network units in response to a request from a network unit;

enqueing the members for transmission to the terminal in queues, each queue being dedicated to members of a specific priority;

requesting, by the network unit, at least a portion of network bandwidth, the request including a transmission time of stored local data awaiting transmission from the network unit to the terminal and a transmission time of data predicted to arrive at the network unit during a waiting time, wherein the data predicted to arrive is determined at least in part on actual received data during a previous waiting time and a weight factor, the weight factor being updateable using an algorithm including at least a step size and a prediction error;

employing the prediction error to adaptively adjust the weight factor to improve an accuracy of the determination of an amount of the data expected to be received during the waiting time;

receiving a granted bandwidth allocation upper-bounded by a smaller value of the bandwidth request and a maximum bandwidth parameter; and sending higher priority data arriving in an interval between a network unit request and a following transmission of data, according to a predefined protocol.

10. The method of claim 9, wherein the predefined protocol enables one of replacing data in the buffer with data being received which is of a higher priority when the buffer is full or sending higher priority data if more data can be transmitted in addition to the stored local data in a current timeslot.

11. A network unit to request a network bandwidth from a terminal configured to serve a plurality of downstream network units and to receive upstream communications from the plurality of network units in respective time slot on a time division basis, the terminal apportioning upstream bandwidth among the plurality of network units by granting a terminal-determined variable duration to respective timeslots of network units in response to a request from a network unit, comprising:

storage for storing local data awaiting transmission from the network unit to the terminal means for requesting at least a portion of network bandwidth with a duration including a transmission time of the stored local data and a transmission time of data predicted to arrive at the network unit during a waiting time, wherein the waiting time an estimate of time required to transmit from the network unit to the terminal data expected to be received in the interval between the request and the initiation of transmission from the network unit to the terminal and wherein the data expected to be received is determined at least in part on actual received data during a previous waiting time and a weight factor, the weight factor being updateable using an algorithm including at least a step size and a prediction error;

means for employing the prediction error to adaptively adjust the weight factor to improve an accuracy of the determination of an amount of the data expected to be received during the waiting time; and means for receiving a granted bandwidth allocation upper-bounded by a smaller value of the bandwidth request and a maximum bandwidth parameter.

12. The network unit of claim 11, wherein the terminal is an optical line terminal located at a service provider central office and the network units are optical network units, optically linked to the terminal.

13. The network unit of claim 11, comprising an interface with a terminal which is a passive splitter for downstream communication.

14. The network unit of claim 11, configured to send the request at a conclusion of sending a burst of data, and wherein the request includes an estimate of time being the time required to transmit data received in the interval between the request and the following initiation of transmission from the network unit to the terminal.

15. The network unit of claim 11, configured to store sets of local information, each member of a set of local information having one of a plurality of predefined priority levels.

16. The network unit of claim 11, further comprising a buffer of members to be transmitted to the terminal, the buffer including a plurality of queues with members for transmission to the terminal, each queue being dedicated to members of a specific priority.

17. The network unit of claim 16, wherein the network unit is configured to replace data in the buffer with a higher priority data being received in the interval between a network unit request and a following transmission of data when the buffer is full.

18. The network unit of claim 16, wherein the network unit is configured to send a higher priority data being received in the interval between a network unit request and a following transmission of data when the buffer is not full.

19. The network unit of claim 16, wherein the buffer is configured to store at least three priority levels, wherein a highest priority level is assigned to members which are delay sensitive and have bandwidth guarantees, a second priority level is assigned to members which are not delay sensitive but have bandwidth guarantees, and a lowest priority level is assigned to members which are not delay sensitive and do not have bandwidth guarantees.

20. A method for allocating a network bandwidth timeslot to a network unit by a terminal, the terminal configured to serve a plurality of downstream network units and to receive upstream communications from a plurality of network units in respective time slots on a time division basis, the terminal further configured to apportion upstream bandwidth among the plurality of network units by granting a terminal-determined variable duration to respective timeslots of network units in response to a request from a network unit, the method comprising:

storing, at one or more of the plurality of network units, local information destined for the terminal;

requesting, by the one or more of the plurality of network units, at least a portion of network bandwidth, the request including a transmission time of stored local data awaiting transmission from the one or more of the plurality of network units to the terminal and a transmission time of data predicted to arrive at the one or more of the plurality of network units during a waiting time, wherein the waiting time is an estimate of the time required to transmit from the one or more of the plurality of network units to the terminal data expected to be received in an interval between the request and the initiation of transmission from the one or more of the plurality of network units to the terminal, wherein the data expected to be received is determined at least in part on actual received data during a previous waiting time and a weight factor, the weight factor being updateable using an algorithm including at least a step size and a prediction error;

employing the prediction error to adaptively adjust the weight factor to improve an accuracy of the determination of an amount of the data expected to be received during the waiting time; and receiving a granted bandwidth allocation upper-bounded by a smaller value of the bandwidth request and a maximum bandwidth parameter;

wherein sets of local information are stored by the one or more of the plurality of network units, each member of a set of local information having one of a plurality of predefined priority levels, and wherein the method further comprises, at the network unit:

maintaining a buffer of members to be transmitted to the terminal;

enqueing members for transmission to the terminal in queues, each queue being dedicated to members of a specific priority; and in the interval between a network unit request and a following transmission of data, replacing data in the buffer with higher priority data being received when the buffer is full.

\* \* \* \* \*